(12) United States Patent
Alger, II et al.

(10) Patent No.: US 8,769,927 B2
(45) Date of Patent: Jul. 8, 2014

(54) EGR CONTROL IN ENGINE EQUIPPED WITH CYLINDERS HAVING DUAL EXHAUST VALVES

(75) Inventors: Terrence F. Alger, II, San Antonio, TX (US); Jess W. Gingrich, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 169 days.

(21) Appl. No.: 13/614,966

(22) Filed: Sep. 13, 2012

(65) Prior Publication Data
US 2014/0069082 A1    Mar. 13, 2014

(51) Int. Cl.
*F01N 3/00* (2006.01)
(52) U.S. Cl.
USPC ............... 60/274; 60/286; 60/323; 60/605.2
(58) Field of Classification Search
CPC ............ F02M 25/07; F01N 3/10; F02B 47/08
USPC ........................................ 60/272–324, 605.2
See application file for complete search history.

(56) References Cited

U.S. PATENT DOCUMENTS

| | | | | |
|---|---|---|---|---|
| 6,347,619 B1 * | 2/2002 | Whiting et al. | .......... | 123/568.12 |
| 6,386,154 B1 * | 5/2002 | Hellman et al. | ............. | 123/58.8 |
| 6,742,506 B1 * | 6/2004 | Grandin | ................... | 123/568.12 |
| 6,953,030 B2 * | 10/2005 | Linderyd et al. | ......... | 123/568.12 |
| 8,601,811 B2 * | 12/2013 | Pursifull et al. | ................ | 60/602 |
| 2013/0239547 A1 * | 9/2013 | Gingrich et al. | ................ | 60/274 |

\* cited by examiner

*Primary Examiner* — Jesse Bogue
(74) *Attorney, Agent, or Firm* — Chowdhury & Georgakis PC; Ann C. Livingston

(57) ABSTRACT

A method and system for controlling recirculated exhaust gas composition and quantity provided to an internal combustion engine, which has one or more separately controllable combustion cylinders, a main exhaust line and an exhaust gas recirculation (EGR) loop. A first exhaust valve is connected to the main exhaust line, and a second exhaust valve is connected to the EGR loop. The operation of the exhaust valves is controlled such that exhaust does not flow through both exhaust valves at the same time. Control of the exhaust valves is coordinated with the main fueling event used to control the exhaust composition exiting each valve for every cylinder on every cycle. During each engine cycle, a post-combustion fuel injection event is also used to add fuel to the exhaust in-cylinder, which flows only through the second (EGR) exhaust valve.

18 Claims, 2 Drawing Sheets

EGR CONTROL IN ENGINE EQUIPPED WITH CYLINDERS HAVING DUAL EXHAUST VALVES

TECHNICAL FIELD OF THE INVENTION

This invention relates to exhaust gas recirculation (EGR) systems, and more particularly to implementing EGR in an engine having cylinders with pairs of dual (segregated) exhaust valves.

BACKGROUND OF THE INVENTION

Exhaust gas recirculation (EGR) is a technology used with internal combustion engines to reduce nitric oxides (NOx) in the engine exhaust. EGR works by recirculating a portion of an engine's exhaust gas back to the engine cylinders. The recirculated exhaust, added to the fuel, oxygen, and combustion products, increases the specific heat capacity of the cylinder contents, which lowers the adiabatic flame temperature. In a spark ignited engine, the recirculated exhaust dilutes the amount of combustible matter in the cylinder.

A properly operating EGR system can increase the efficiency of a spark ignited engine. EGR improves the knock tolerance of the engine, which allows improved combustion phasing and increased compression ratio. The combined effect of the improved phasing and compression ratio improves efficiency and reduces fuel consumption.

EGR has conventionally been utilized as inert dilution. A conventional spark ignited engine's EGR system typically sources the EGR from the same exhaust volume that is delivered to the emissions control aftertreatment device. Therefore, the EGR gas composition is governed by the emission control device requirements for inlet gas composition.

However, it may be advantageous to decouple the EGR from the constraints of the exhaust aftertreatment system. Changing the EGR composition and quantity have been shown to significantly improve combustion on spark ignited engines using EGR. Decoupling the exhaust EGR from the aftertreatment gas constraints can be achieved to enable higher quality EGR while still maintaining exhaust composition compliant with conventional three-way catalyst after treatment.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to internal combustion engines whose cylinders have dual, also referred to as "segregated", exhaust valves. More specifically, each cylinder has two physically separated exhaust ports, each port having its own exhaust valve. The exhaust valves deliver exhaust from the cylinder into two separate exhaust systems.

For purposes of this description it is assumed that one exhaust valve delivers exhaust into the exhaust system that exhausts to the atmosphere. This exhaust system may first route the exhaust to a turbine that drives the engine's turbocharger. The other exhaust valve delivers exhaust to a recirculated exhaust (EGR) loop. As explained below, this "dual exhaust" configuration allows the exhaust valves to be controlled in a manner that provides control over the flow path taken by the gas exhausted from the combustion chamber. Flow can exit the cylinder through the turbine circuit, or through the EGR circuit exclusively. This controllable configuration enables high EGR quality (quantity of partial combustion products H2 and CO) while also controlling the stoichiometry of engine exhaust to be compliant with conventional three-way catalyst emissions reduction technologies.

In the example of this description, the engine is a spark ignited internal combustion engine of the type used for automotive vehicles. However, the same concepts could be applied to other spark ignited internal combustion engines that are equipped with segregated exhaust valves and a dual exhaust system as described above.

Figure 1:
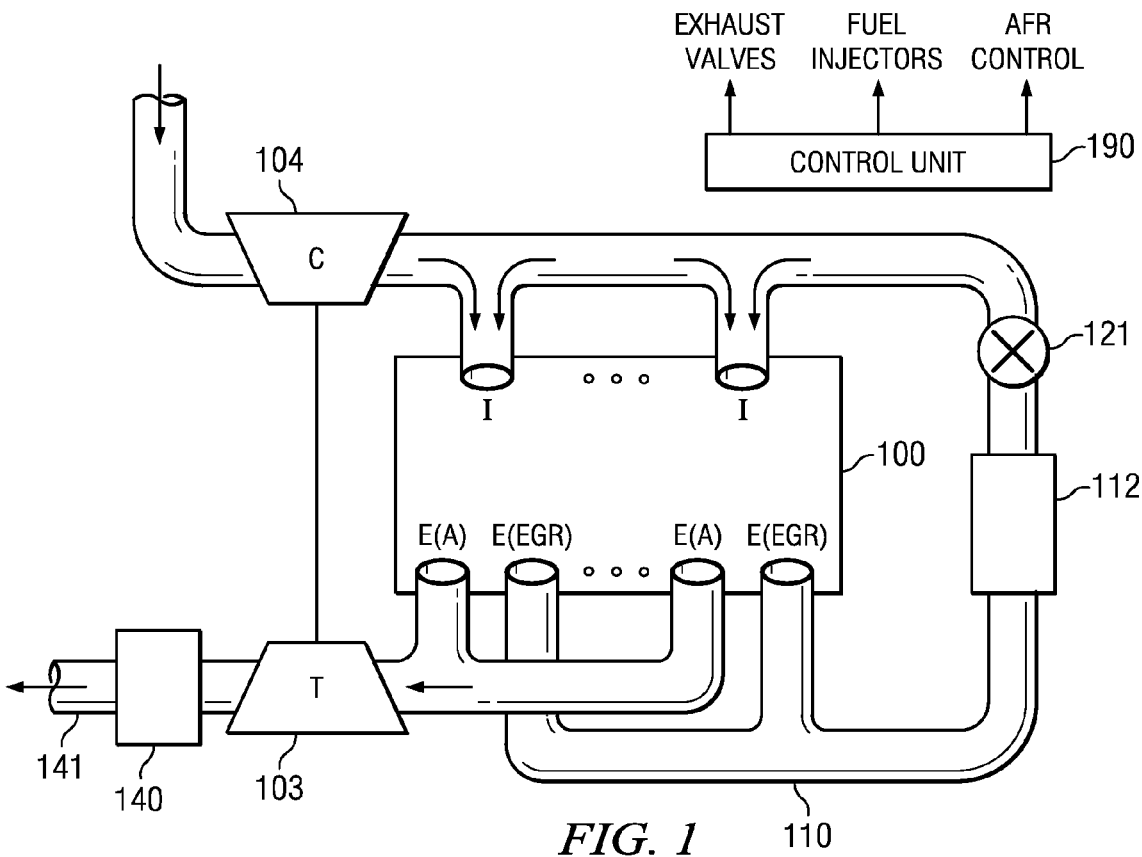
FIG. 1 illustrates an internal combustion engine whose cylinders have dual exhaust valves, one connected to the engine's exhaust system and the other connected to an EGR loop.

FIG. 1 illustrates an engine 100 with cylinders having segregated exhaust valves, ports and a dual exhaust system. Each cylinder is represented by its intake valve and two exhaust valves, indentified as "I" and "E" respectively. Two cylinders are explicitly shown; in practice, as indicated by the ellipses in FIG. 1, an engine may have any number of cylinders.

Figure 2:
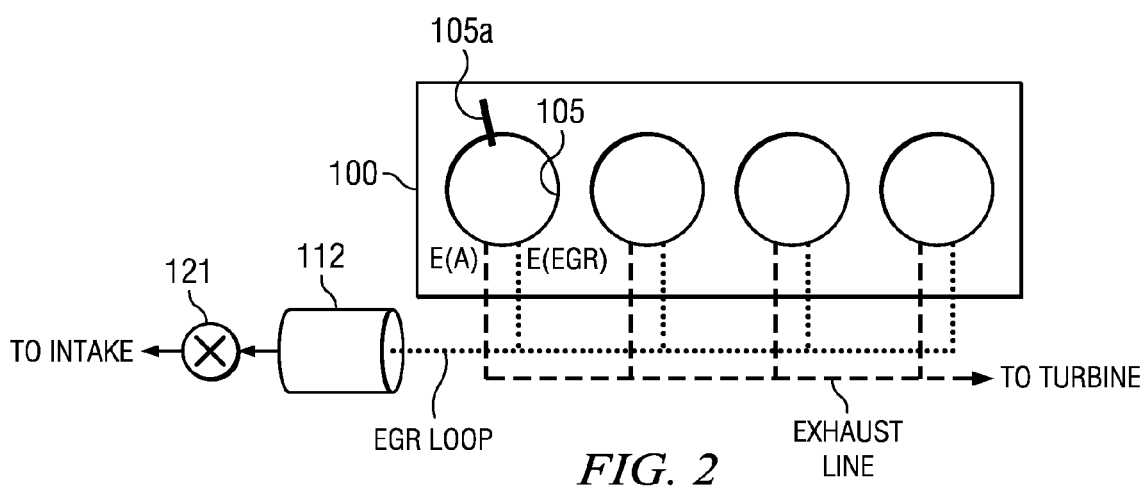
FIG. 2 also illustrates an engine like that of FIG. 1.

FIG. 2 is a similar illustration of engine 100 showing four cylinders 105, each also having segregated exhaust valves. The intake valves are not explicitly shown. Each cylinder 105 has a pair of exhaust valves, one connected to the engine's main exhaust line and out the tailpipe (via the turbine 103) and the other connected to an EGR loop 110. These dual exhaust valves and their connection to their respective systems are represented by the dashed and dotted lines.

Thus, in both FIG. 1 and FIG. 2, exhaust from one valve, E, of each cylinder is connected to the engine's main exhaust line. The "main exhaust line" as used herein means the exhaust line that exhausts to the atmosphere (here, via a turbine 103), and is typically treated by one or more exhaust aftertreatment devices 140 before being exhausted from the tailpipe 141.

Exhaust from the other valve, E, of each cylinder is connected to an EGR circuit 110. For purposes of this description, the cylinder exhaust valve "E" that delivers exhaust into the exhaust system may be referred to as the "atmosphere exhaust valve" or "E(A)". The cylinder exhaust valve "E" that delivers exhaust into the EGR loop 110 may be referred to as the "EGR exhaust valve" or "E(EGR)". The amount of exhaust mass exiting the cylinders through either E(EGR) or E(A) depends on the desired routing that results in the desired engine operation. Both exhaust valves are controlled by the control unit 190. Control of the valve opening timing, lift profile, and closing timing are used to route cylinder exhaust gas as desired.

In the example of FIGS. 1 and 2, EGR loop 110 is a high pressure loop. A conventional definition of a high-pressure loop system is where the exhaust to be recirculated is extracted upstream of the turbocharger's turbine 103 and routed to the engine intake downstream of the turbocharger's compressor 104. An EGR valve 121 controls the flow of EGR into the engine intake in conjunction with E(EGR).

Figure 3:
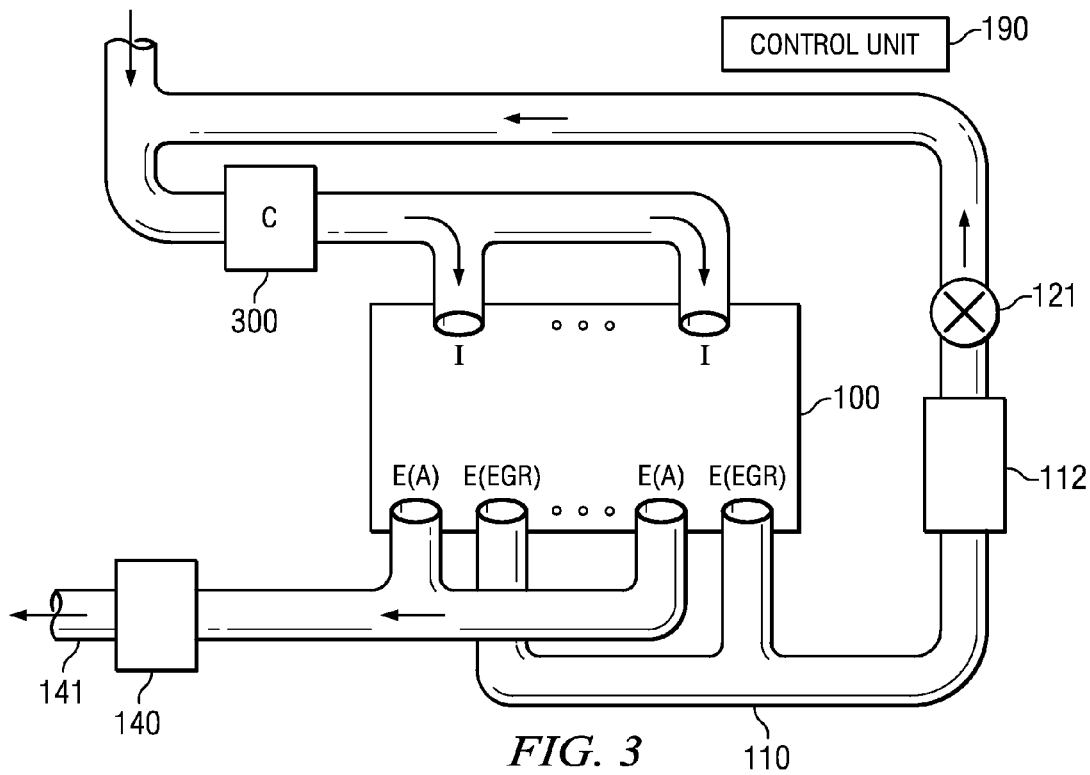
FIG. 3 illustrates an alternative embodiment with an engine having a supercharger rather than a turbocharger.
Figure 4:
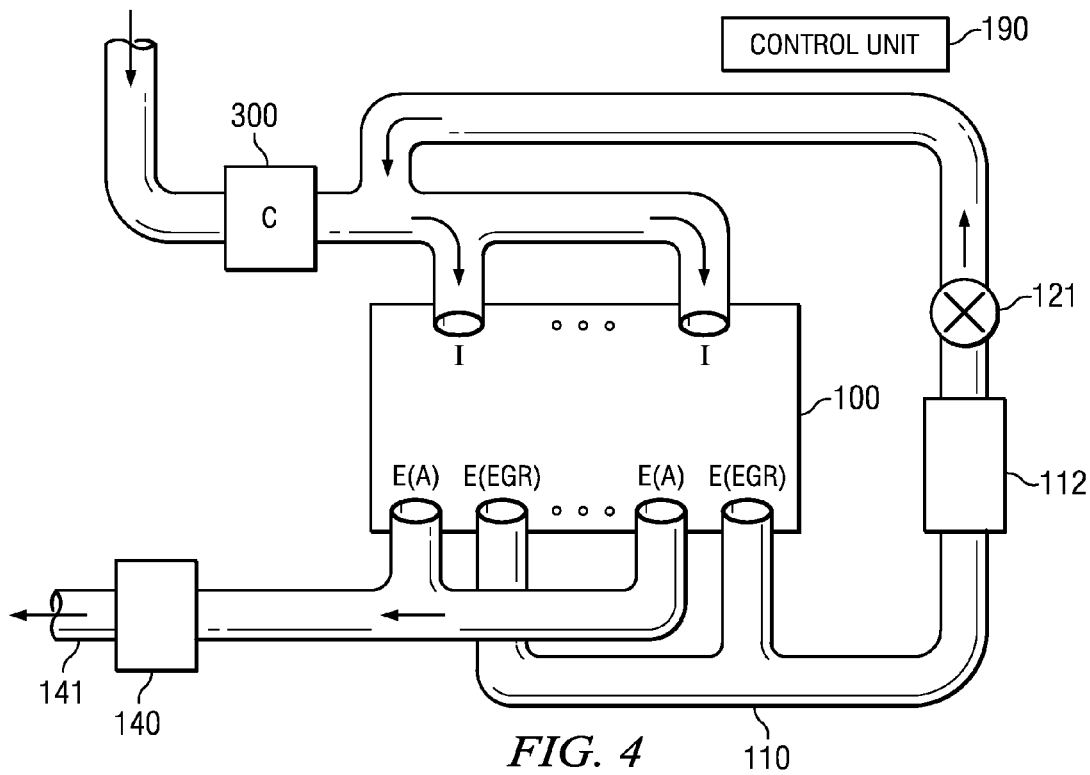
FIG. 4 also illustrates an alternative embodiment with an engine having a supercharger rather than a turbocharger.

FIGS. 3 and 4 illustrate an engine system similar to that of FIGS. 1 and 2, but having a supercharger rather than a turbocharger. In an engine having a supercharged rather than turbocharged configuration, the air boosting system will include a compressor 300 and not a turbine. The EGR circuit may route the recirculated exhaust either upstream or downstream of the supercharger's compressor. In the example of FIG. 3, the EGR circuit is routed upstream the compressor 300. In FIG. 4, the EGR circuit is routed downstream the compressor 300.

Referring to FIGS. 1-3, it is assumed for purposes of this description, that the exhaust valves of each pair may be actuated independently of each other. Examples of commercially available segregated exhaust valves of this type are those marketed as BorgWarner's Valve Event Modulated Boosting (VEMB), Mahle's Cam-in-Cam system, BMW's Valvetronic, and Valeo's E-Valve.

Potentially suitable segregated exhaust valves are those with variable valve timing, also known as variable valve actuation. The variable valve timing allows the lift, duration or timing (in various combinations) of the exhaust valves to be changed while the engine is in operation. For example, many piston engines use poppet valves for intake and exhaust, driven (directly or indirectly) by cams on a camshaft. The cams open the valves (lift) for a certain amount of time (duration) during each intake and exhaust cycle. The timing of the valve opening and closing is also important.

In the example of this description, engine 100 is a Gasoline Direct Injection (GDI) internal combustion engine. For these engines, the gasoline is highly pressurized, and is injected via a common rail fuel line directly into the combustion chamber of each cylinder. However, the control methods described herein could be applied to other internal combustion engines, such as an engine in which the primary fueling method is multi-point fuel injection or fuel fumigation. For the post-injection fuel event described below, the cylinders are designed to allow this post-injection event with an in-cylinder injector 105*a*.

The EGR system has a control unit 190, which may be dedicated to EGR control or may be part of a more comprehensive engine control unit (ECU). Control unit 190 may be implemented with conventional processing and memory devices. As explained below, tasks of control unit 19 relevant to this description may include control of the cylinder exhaust valves E(A) and E(EGR), EGR valve 121, or other aspects of the process used to provide recirculated exhaust at a desired rate and composition.

Specifically, control unit 190 may be used to control the valve timing and phasing of exhaust valves E(A) and E(EGR) in such a way that none of the exhaust from the engine flows through both exhaust valves at the same time. As explained below, control unit 190 may perform two distinct EGR control methods: a post-combustion fuel injection event and/or cycle-by-cycle air-fuel ratio control (rich versus stoichiometric) of the main fuel event. Both of these EGR control methods (post combustion fuel injection or rich main fueling) generate exhaust intended to improve EGR composition. The fueling control is coordinated with the cylinder exhaust valve control so that exhaust intended for EGR exits the cylinder via the E(EGR) exhaust valve and exhaust intended for the aftertreatment system exits the cylinder via the E(A) exhaust valve.

Thus, control unit 190 may be further programmed to activate a post-combustion fuel injection event, during every engine cycle, for some or all cylinders, or as otherwise programmed. The post-injection fuel event increases the amount of unburned fuel in the exhaust. By injecting fuel into the cylinder chamber while the exhaust gases are still relatively hot, some amount of partial oxidation can occur. The result is increased formation of CO and H2 in the exhaust.

The post-combustion fuel injection event is timed so that the fuel-injected exhaust does not exit the cylinder through exhaust valve E(A) (the exhaust valve connected to the turbocharger and aftertreatment system). Instead, the fuel-injected exhaust must exit each cylinder only through that cylinder's E(EGR) exhaust valve (the exhaust valve connected to the EGR loop). Partial oxidation of the fuel from this post-combustion injection will increase the hydrogen (H2) and carbon monoxide (CO) content of the EGR. The separated configuration of the EGR loop 110 will ensure that all, or nearly all, of the fuel is re-routed back into the engine's intake for consumption.

The EGR loop 110 may route exhaust through a catalyst 112, which may be a partial oxidation catalyst or water-gas shift catalyst. Catalyst 112 is designed to further increase the level of H2 and/or CO in the recirculated exhaust. Alternatively, a three-way catalyst in the EGR loop 110 might also serve to partially oxidize fuel in the exhaust and thereby increase H2 and CO in the recirculated exhaust.

A further feature of the invention is the use of exhaust valves E(A) and E(EGR) and of control unit 190 to control of the ratio of exhaust mass that flows through the turbocharger versus the exhaust mass that flows through the EGR loop. This can be done by controlling the valve events (phasing, lift and/or duration) of the E(EGR) exhaust valve, resulting in more or less mass flow from each cylinder's EGR port. For example, the E(A) and E(EGR) valves could have fixed, but different, phasing to separate their exhaust events, with a variable lift on the E(EGR) valve to control the EGR flow rate. As another example, the E(A) and E(EGR) valves could have fixed, but different, phasing and lift to separate their exhaust events, with a variable duration on the E(EGR) valve to control the EGR flow rate.

Optionally, during the engine design process, the relative port sizes of a cylinder's pair of exhaust valves can be varied to increase the mass flow through E(A) and limit the peak EGR rates of the engine. Then, variable valve events (phasing, lift and/or duration) in combination with different valve diameters can be used to control the relative mass flow (and hence the EGR rate) between the two exhaust valves.

EGR valve 121 may be used as an additional control on the EGR rate. EGR valve 121 allows control unit 190 to shut off all EGR in times when it is not desired, such as during cold start or warm-up. EGR valve 121 can be a variable output valve or an on-off type valve. The EGR valve 121 may or may not be required in the EGR loop if the cylinder exhaust valve sizing and valve events can be controlled properly.

A further or other control strategy can be implemented if the cylinder exhaust valves provide for control of each cycle of the four stroke engine cycle, referred to herein as "cycle-by-cycle control". In this case, control unit 190 may be programmed to use cycle-by-cycle control to vary the quantity and quality of the recirculated exhaust gas. "Recirculated exhaust gas quality" is a broad term used to describe the knock suppression and flame speed augmentation qualities of EGR determined by the proportion of specific constituents in the EGR gas.

More specifically, control unit 190 can be programmed to coordinate, on a cycle-by-cycle basis, which exhaust port will open and how much over-fueling to provide a cylinder. This means that any number of cylinders can be high quality EGR generating cylinder when necessary.

For example, with a four cylinder engine, every fourth cycle, each cylinder could be operated with a richer than normal air-fuel ratio and exhausted completely through its EGR exhaust valve, E(EGR). For the other cycles, each cylinder could be operated stoichiometrically and exhausted through its non-EGR exhaust valve, E(A). As a result, the engine would operate with an EGR rate of approximately 25%. If only three cylinders were operated in this manner then the EGR rate would be approximately 19%. If one cylinder were operated at twice the frequency then the EGR rate would be 31%. In this manner, the engine could operate with an EGR rate ranging from 0% up to the engine's dilution tolerance limit. This could be accomplished at discrete EGR steps of about 5% EGR. The discrete steps are dependent on the cylinder count, and could be varied across the engine map to suit the requirements of a given engine and its application.

The immediately above-described method may be referred to as the "rich cycle EGR control method". A feature of this method is that during rich engine cycles, all exhaust exits through the E(EGR) valve to the EGR circuit.

The rich cycle EGR control method and the above-described EGR control method that uses post combustion fuel injection may be performed independently. Or, the two methods can be combined.

If a cylinder is run rich (with or without post injection), its exhaust only goes out the EGR circuit. If a cylinder is run stoichiometrically with post injection (for all cycles or with other cycles being rich), the two exhaust valves open during the same engine cycle. That is, stoichiometric exhaust exits the E(A) exhaust valve, with the E(EGR) exhaust valve opening later than the E(A) exhaust valve to allow exhaust that has received post-injected fuel to exit to the EGR circuit.

In sum, segregated exhaust valves and dual exhaust loops as described above may be used to provide partially oxidized fuel in the EGR loop and thereby increase the EGR tolerance of the engine. This in turn can result in improved burn rates, reduced emissions and improved fuel efficiency. The presence of unburned fuel may allow one or more of the following: increased specific power output of the engine, improved combustion phasing through the reduction of knock, an increase in the knock tolerance enabling an increase in compression ratio, reduced pumping losses due to improved EGR tolerance, and decreased HC, CO and PM emissions.

What is claimed is:

1. A method of controlling recirculated exhaust gas provided to an internal combustion engine, which has one or more combustion cylinders, a main exhaust line and an exhaust gas recirculation (EGR) loop, comprising:
    providing each cylinder with two exhaust valves, each separately controllable;
    wherein a first exhaust valve is connected to the main exhaust line and a second exhaust valve is connected to the EGR loop;
    controlling the exhaust valves such that exhaust from each cylinder does not flow through both of its exhaust valves at the same time;
    providing a post-combustion fuel injection event during each engine cycle; and
    timing the post-combustion fuel injection event and the operation of the exhaust valves so that exhaust from the post-combustion fuel injection event flows only through the second exhaust valve.

2. The method of claim 1, further comprising routing the recirculated exhaust through a catalytic conversion unit on the EGR loop.

3. The method of claim 1, further comprising routing the recirculated exhaust through a water gas shift catalyst on the EGR loop.

4. The method of claim 1, further comprising controlling the ratio of exhaust that flows from the first exhaust valve into the main exhaust line versus the exhaust that flows from the second exhaust valve into the EGR loop.

5. The method of claim 4, wherein the controlling is performed by controlling the exhaust valve events (phasing, lift and/or duration) of the second exhaust valve, resulting in more or less mass flow from each cylinder's EGR port.

6. The method of claim 1, wherein the two exhaust valves of each cylinder have the same size ports.

7. The method of claim 1, wherein the two exhaust valves of each cylinder have differently sized ports.

8. The method of claim 1, further comprising controlling operating one or more cylinders rich and exhausting its exhaust entirely from its second exhaust valve.

9. The method of claim 1, wherein the one or more cylinder is operated rich and exhausted through its second exhaust valve on a cycle-by-cycle basis.

10. A recirculated exhaust gas system for an internal combustion engine, which has one or more combustion cylinders, each having a pair of separately controllable exhaust valves and a main exhaust line connected to a first one of each pair of exhaust valves, comprising:
    an exhaust gas recirculation (EGR) loop connected to a second one of each pair of exhaust valves;
    a control unit programmed to control the exhaust valves such that exhaust from each cylinder does not flow through both of its exhaust valves at the same time, and to activate a post-combustion fuel injection event during each engine cycle;
    wherein the post-combustion fuel injection event and the operation of the exhaust valves are timed so that exhaust from the post-combustion fuel injection event flows only through the second exhaust valve.

11. The system of claim 10, wherein the EGR loop has an oxidation catalyst.

12. The system of claim 10, wherein the EGR loop has a water gas shift catalyst.

13. The system of claim 10, wherein the control unit is further programmed to control the ratio of exhaust that flows from the first exhaust valve into the main exhaust line versus the exhaust that flows from the second exhaust valve into the EGR loop.

14. The system of claim 13, wherein the controlling is performed by controlling the exhaust valve events (phasing, lift and/or duration) of the second exhaust valve, resulting in more or less mass flow from each cylinder's EGR port.

15. The system of claim 10, wherein the two exhaust valves of each cylinder have the same size ports.

16. The system of claim 10, wherein the two exhaust valves of each cylinder have differently sized ports.

17. The system of claim 10, wherein the control unit is further programmed to operate one or more cylinders rich and exhausting its exhaust entirely from its second exhaust valve.

18. The system of claim 10, wherein the one or more cylinder is operated rich and exhausted through its second exhaust valve on a cycle-by-cycle basis.

* * * * *